Dec. 20, 1955 M. M. CARPENTER, JR 2,728,022

TRI-COLOR KINESCOPE BEAM CONVERGENCE APPARATUS

Filed June 18, 1953 2 Sheets-Sheet 1

INVENTOR.
MARSHALL M. CARPENTER, JR.

BY W. H. Sponagle
ATTORNEY

TRI-COLOR KINESCOPE BEAM CONVERGENCE APPARATUS

Filed June 18, 1953 2 Sheets-Sheet 2

INVENTOR.
MARSHALL M. CARPENTER, JR.

BY [signature]
ATTORNEY 2,728,022
Patented Dec. 20, 1955

2,728,022

TRI-COLOR KINESCOPE BEAM CONVERGENCE APPARATUS

Marshall M. Carpenter, Jr., Princeton, N. J., assignor to Radio Corporation of America, a corporation of Delaware Application June 18, 1953, Serial No. 362,615

5 Claims. (Cl. 315—13)

This invention relates to systems for controlling the electron beam energy of cathode ray tubes. It pertains particularly to the control of a plurality of electron beam components used in television kinescopes so as to effect substantial convergence of the components at all points of a raster scanned in a predetermined plane.

One type of cathode ray tube in which there is encountered the problem of maintaining substantial convergence of a plurality of beam components in the plane of a target electrode is a color kinescope such as that disclosed in a paper by H. B. Law titled "A three-gun shadow-mask color kinescope" published in the proceedings of the I. R. E., vol. 39, No. 10, October 1951, at page 1186. Such a tube has a luminescent screen consisting of a multiplicity of phosphor areas of sub-elemental dimensions. Different ones of the phosphor areas are capable of producing light of the component image colors when excited by electron beam energy. In this tube, the different light-producing phosphor areas are excited respectively by a plurality of electron beams, or by a plurality of components of a single beam, approaching the screen from different angles through an apertured electrode. Color selection is secured by the angle at which the electron beam components approach the screen. A tube of the kind described forms the subject matter of U. S. Patent 2,595,548 granted May 6, 1952, to Alfred C. Schroeder for "Picture Reproducing Apparatus."

The expression "electron beam components" as used in this specification and claims will be understood to denote the phosphor-exciting electronic energy produced either by a single, or by a plurality of, electron guns. This energy may be either continuous or pulsating without departing from the scope of the invention. An example of a color kinescope in which different components of a single electron beam are used to excite a phosphor screen of the kind described is disclosed in a paper by R. R. Law, titled "A one-gun shadow-mask color kinescope" published in the proceedings of the I. R. E., vol. 39, No. 10, October 1951, at page 1194. Such a tube forms the subject matter of a copending U. S. application of Russell R. Law, Serial No. 165,552, filed June 1, 1950, and titled "Color Television."

The successful operation of a multi-color kinescope of the type referred to requires that the plurality of electron beam components be made to converge substantially in the plane of the apertured electrode at all points in the scanned raster. In view of the fact that the different points of such a target electrode are at different distances from the point or region of the electron beam deflection, it is necessary to provide a field-producing means which is variably energized to produce the desired dynamic beam convergence control. One such electron beam control system is disclosed in a paper by Albert W. Friend titled "Deffection and convergence in color kinescopes" published in the Proceedings of the I. R. E., vol. 39, No. 10, October 1951, at page 1249. Such a system forms the subject matter of a copending U. S. application of Albert W. Friend, Serial No. 164,444, filed May 26, 1950, and titled "Electron Beam Control System." In the system proposed by Friend, electron-optical apparatus is energized both statically and dynamically to produce the desired result. By means including the static energization of the electron-optical apparatus, the Friend system effects initial convergence of the electron beam components substantially at the center of the raster to be scanned. The dynamic energization of the electron-optical apparatus is effected as functions of both the horizontal and vertical beam deflection. These functions are generally parabolic. However, somewhat complicated apparatus is required to produce parabolic energizing waveforms. Furthermore, good beam convergence in the corners of the raster requires energization by a waveform having a steeper slope at its sides than a parabola.

Therefore, it is an object of this invention to provide improved and simplified apparatus by which to develop waveforms suitable for the dynamic energization of an electron beam-controlling system for a multi-beam kinescope so as to effect convergence of a plurality of electron beams at all points in a scanned raster, including the corners thereof.

In accordance with this invention there is provided apparatus for developing waves suitable to control the beam convergence apparatus of a tri-color kinescope by combining relatively simple waveforms to produce one having approximately the desired shape. In one form of the invention, the beam convergence control wave is produced by combining sinusoidal and square waves. In another form of the invention, the beam convergence control wave is produced by combining opposite phases of a sawtooth wave. In still another form of the invention, a sinusoidal wave is full-wave rectified in a manner to produce the convergence control wave.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings.

Figure 1:
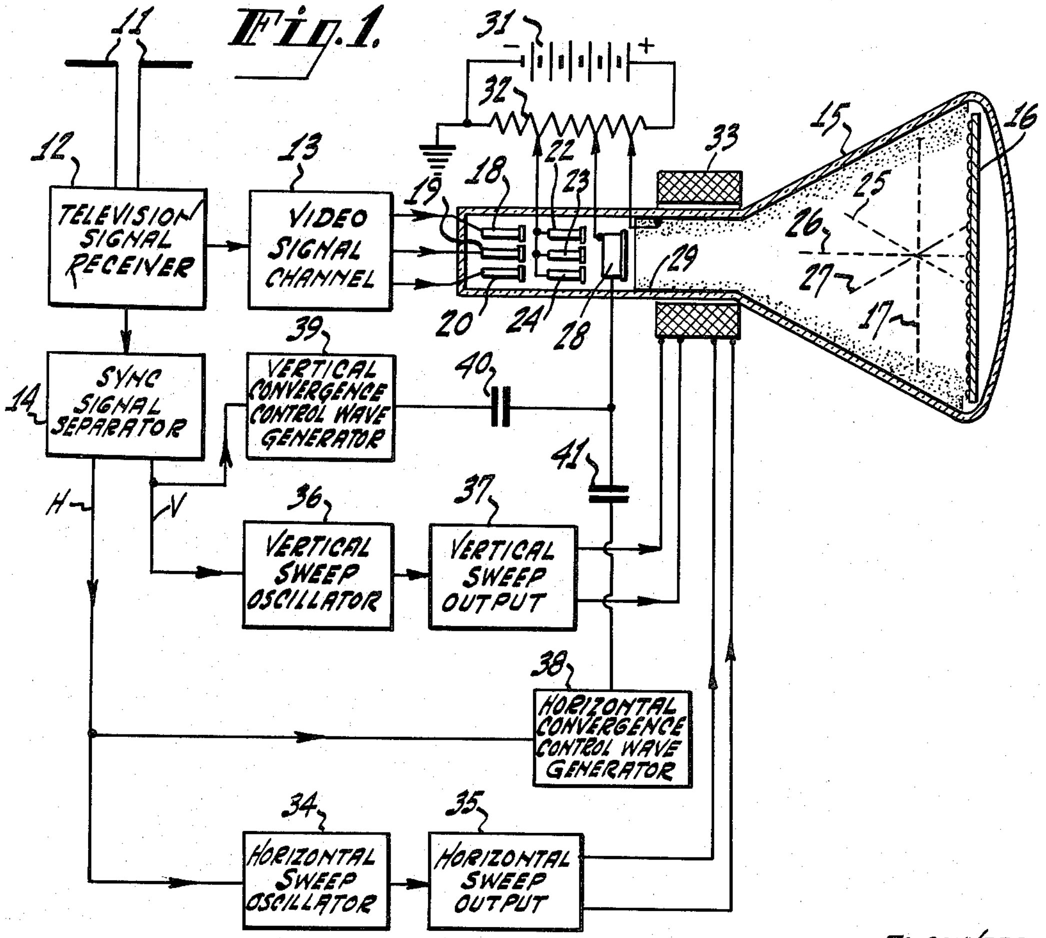
Figure 1 is a block circuit diagram of color television receiver apparatus of the general type embodying the present invention.

Reference first will be made to Figure 1 of the drawings for a description of an illustrative embodiment of the invention. The television receiver represented in this figure is generally conventional and includes an antenna 11 to which is coupled a conventional television signal receiver 12. It will be understood that the receiver 12 may include such usual apparatus as carrier wave amplifiers at both radio and intermediate frequencies, a frequency converter and a carrier wave demodulator or signal detector. Accordingly, it will be understood that there are derived from the receiver 12 the video and synchronizing signals. The video signals derived from the receiver 12 are impressed upon a video signal channel 13 and the synchronizing signals are impressed upon a sync signal separator 14. The video signal channel is coupled to the usual electron beam control apparatus, customarily referred to as electron gun apparatus, of an image-reproducing device such as a kinescope 15.

In the illustrative embodiment of the invention, it is assumed that the invention is used in a color television system. In this case, the kinescope is of the same general type disclosed in the H. B. Law paper previously referred to. It will be understood, however, that the kinescope alternatively may be of other types such as that shown in the aforementioned R. R. Law paper. In either case, however, the kinescope has a substantially flat luminescent screen 16 which is provided with a multiplicity of small phosphor areas arranged in groups and capable respectively of producing light of the different primary colors in which the image is to be reproduced when excited by electron beam energy. In back of, and spaced from the screen 16, there is an apertured masking electrode 17 having an aperture for, and in alignment with each group of phosphor areas of the screen 16. In the particular tube illustrated, the kinescope also has a plurality of electron guns 18, 19 and 20, equal in number to the number of primary colors in which the image is to be reproduced. As previously indicated, these three electron guns are coupled to the video signal channel 13 for respective control by video signals representing the three primary colors in which the image is to be reproduced. It will be understood that each of these guns may be conventional consisting of a cathode, a control grid, and a first anode, or beam-forming electrode. Also associated with the three electron guns are corresponding individual beam-focusing anodes 22, 23 and 24. The three electron guns 18, 19 and 20, together with their associated focusing electrodes 22, 23 and 24 respectively, function to develop respective electron beams 25, 26 and 27 which are caused to approach the target electrode structure, including the luminescent screen 16 and the masking electrode 17, from three different angles which, for convenience, have been shown greatly exaggerated in the drawing. By reason of the different angles of approach these beams are caused to excite the different colored light-producing phosphors.

The color kinescope 15 additionally is provided with an electrostatic type of beam-converging apparatus which includes a convergence anode 28 located adjacent the paths followed by the electron beams in the predeflection region. The kinescope also includes the usual final, or beam-accelerating, anode 29 generally in the form of a wall coating substantially as shown and extending from the predeflection region adjacent to the convergence anode 28 to the vicinity of the target electrode structure including the screen 16.

The different static potentials which are impressed upon the various kinescope electrodes are derived from a power supply 31, across the terminals of which is connected a voltage divider resistor 32. The various electrode potentials are derived by making suitable connections to the voltage divider resistor generally in the manner shown. The individual beam-focusing electrodes 22, 23 and 24 are connected together with and to a relatively low positive potential point on the voltage divider resistor 32. The convergence anode 28 is coupled to a somewhat higher positive potential point of the resistor 32 so that, as a result of the potential difference between it and the individual beam focusing anodes 22, 23 and 24, there are produced electrostatic electron-optical lenses by which individual beam focusing is effected. In a like manner, the final anode 29 is connected to a relatively high positive potential point on the voltage divider resistor 32 so as to create another electron-optical lens with the convergence anode 28. The purpose of this latter electron-optical device is to produce the desired convergence of the individual electron beams substantially in the plane of the apertured electrode 17.

The color kinescope 15 also is provided with apparatus by which to deflect the plurality of electron beam components both vertically and horizontally to scan the usual raster at the luminescent screen 16. In this embodiment of the invention the deflection apparatus includes a yoke 33 which in general is of a conventional type. It consists of a pair of interconnected coils forming a horizontal deflection winding and another pair of coils forming a vertical deflection winding. The yoke is mounted around the neck of the kinescope in the region adjacent to the point at which the neck joins the conical section of the tube. The horizontal and vertical windings of the yoke 33 are energized by substantially conventional apparatus. The sync signal separator 14, which separates the sync signals from the video signals and from one another, produces horizontal and vertical frequency sync signals respectively in its output circuits H and V. The horizontal output circuit H is coupled to a horizontal sweep oscillator 34, the output of which, in turn, is coupled to the input circuit of a horizontal sweep output apparatus 35. Both of these horizontal sweep components may be entirely conventional. The output circuit of the horizontal sweep output apparatus 35 is coupled to the horizontal deflection winding of the yoke 33 in the customary manner.

The vertical sync separator output circuit V is coupled to a vertical sweep oscillator 36. The output of the vertical sweep oscillator is coupled to the input circuit of a vertical sweep output apparatus 37. The output circuit of the vertical sweep output apparatus is connected to the vertical deflection winding of the yoke 33.

The beam convergence controlling system embodying this invention includes horizontal and vertical convergence control wave generators 38 and 39 respectively. It will be understood that these generators function in accordance with a feature of this invention to produce the desired convergence control waves at the horizontal and vertical deflection frequencies respectively for impression by means such as coupling capacitors 40 and 41 upon the convergence anode 28 of the color kinescope 15.

Figures 2, 3:
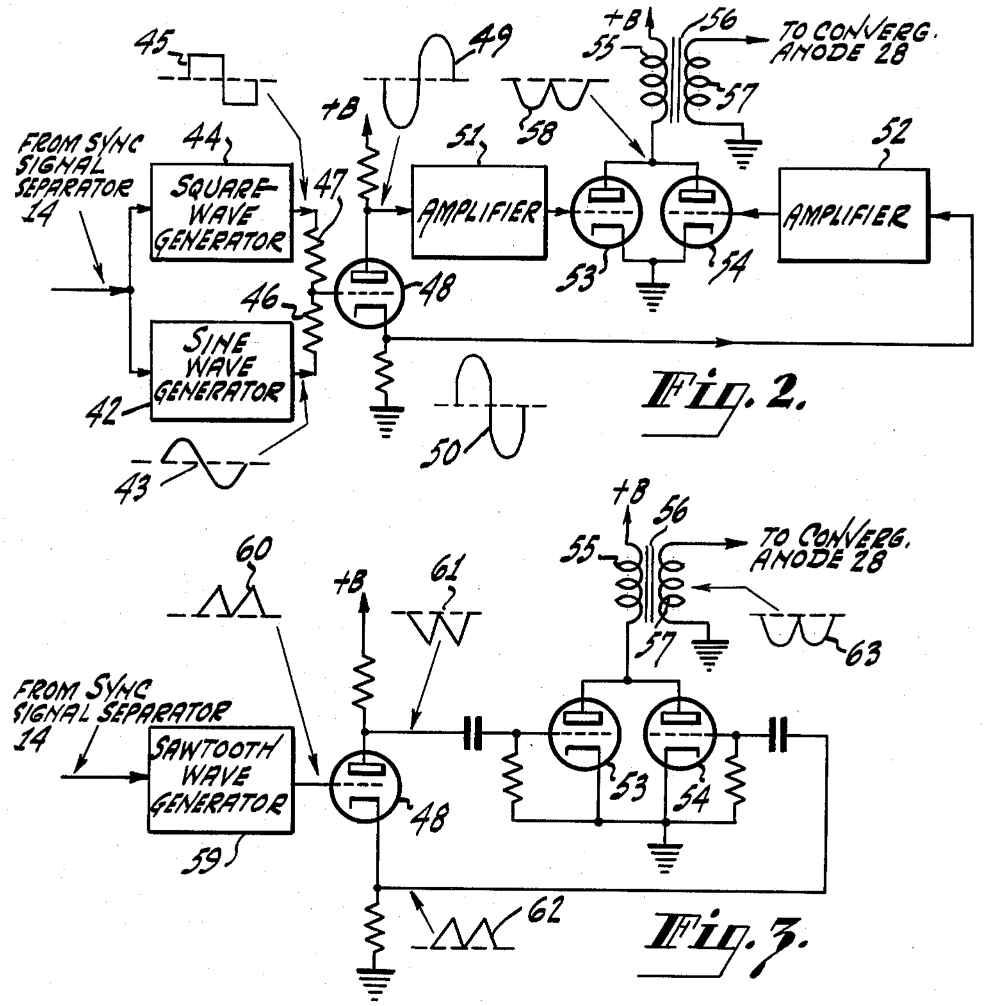
Figure 2 is a schematic circuit diagram showing a form of the convergence control wave generator in which sine and square waves are combined.
Figure 3 is another embodiment of the invention in which the convergence control wave generator combines opposite phases of a sawtooth wave.

Reference now will be made to Figure 2 for a description of illustrative apparatus embodying a form of the invention in which a sine wave and a square wave are combined to produce the convergence control wave. The apparatus comprises a sine wave generator 42 which may be of a conventional form such as a pulsed sine wave Hartley type of oscillator described in a book titled "Waveforms" published by the McGraw-Hill Book Co., Inc., New York, N. Y., in Figure 4–45, page 143. Such a sine wave generator is one having relatively good stability and one which is susceptible of being synchronously controlled at a desired frequency. In the present form of the invention, the sine wave generator 42 operates at a frequency which is one-half of the deflection frequency at which the beam convergence wave is to be reproduced. For example, if the desired convergence wave is to have the horizontal or line deflection frequency of 15,750 cycles per second, then the sine wave generator 42 produces a substantially sinusoidal wave 43 having a frequency of 7,875 cycles per second. It will be understood that if the desired convergence wave is to be reproduced at vertical or field deflection frequency, the sine wave 43 will have a frequency of 30 cycles per second.

The convergence wave generating apparatus also includes a square wave generator 44 which may be of a conventional character such as a multivibrator, either of the free-running or bi-stable types. A representative example of a bi-stable multivibrator which is susceptible of use in practicing the invention is given in a publication titled "Waveforms" in the book titled "Waveforms," previously referred to, in Figure 5–4, page 164.

As in the case of the sine wave generator 42, the square wave generator 44 produces a substantially square wave 45 having one-half of the deflection frequency relative to which the convergence wave is to be generated. Both the sine wave and square wave generators 42 and 44 are coupled to suitable circuits such as the appropriate output circuit of the sync signal separator 14 for the derivation of synchronizing signals by which the two convergence wave generator components are to be maintained in synchronous operation.

The outputs of the respective sine wave and square wave generators 42 and 44 are coupled by means including resistors 46 and 47 to the control grid circuit of a phase inverter electron tube 48. By virtue of the described input circuit of the tube 48, the sine wave 43 is added in phase to the square wave 45. As a consequence, there are produced respectively at the anode and cathode electrodes of the tube 48 opposite phases of composite waves 49 and 50. Each of the composite waves is seen to have a sine wave component and a square wave component.

The anode and cathode electrodes of the phase inverter tube 48 are coupled respectively by means including amplifiers 51 and 52 to the control grids of a pair of signal combining electron tubes 53 and 54 respectively. The anode circuits of these tubes are connected together and to the primary winding 55 of an output step-up transformer 56, the secondary winding 57 of which is coupled to the convergence anode 28 of the apparatus of Figure 1. By virtue of the described connections of the tubes 53 and 54, the composite waves 49 and 50 are combined to produce a convergence control wave 58 having a form which approximates the ideal parabolic form sufficiently to effect a satisfactory operation of the beam convergence apparatus.

It is seen that the convergence control wave 58 has twice the frequency of the sine and square waves 43 and 45 respectively from which it is derived so that, as generated, it has the desired deflection frequency. In order to produce the convergence control wave 58, the signal combining tubes 53 and 54 are biased for class B operation so that the voltage produced at the anodes thereof which is represented by the wave 58 simulates a substantially full wave rectification of the composite waves 49 and 50. In this general connection it is to be noted that one purpose of adding the square wave 45 to the sine wave 43 is to force whichever one of the combining tubes 53 or 54 that is conducting through its grid cut-off point as rapidly as possible in order to avoid operation for any substantial period of time in the non-linear portion of its characteristic. Also, it is seen that the use of the square wave component in the production of the waves 49 and 50 results in the development of a convergence control wave 58 in which the slopes are steeper than those of a parabolic wave. Hence, better corner beam convergence may be achieved.

A somewhat different form of the invention is shown in Figure 3, to which reference now will be made. In this case, there is provided a sawtooth wave generator 59 which may be of any conventional form, an example of which is disclosed in U. S. Patent 2,157,434 granted May 9, 1939, to J. L. Potter and titled "Oscillator Circuit." The substantially sawtooth wave 60 derived from the generator 59 is impressed upon the control grid circuit of the phase inverter tube 48. Accordingly, there are derived respectively from the anode and cathode electrodes of this tube substantially identical sawtooth waves 61 and 62 of opposite phase.

These oppositely phased sawtooth waves are impressed respectively upon the control grid circuits of the wave combining tubes 53 and 54 so as to produce in the common output circuit of these tubes including the secondary winding 57 of the transformer 56, a convergence control wave 63. As in the other form of the invention, the convergence control wave 53 is impressed upon the convergence anode 28 of the tri-color kinescope.

Figure 4:
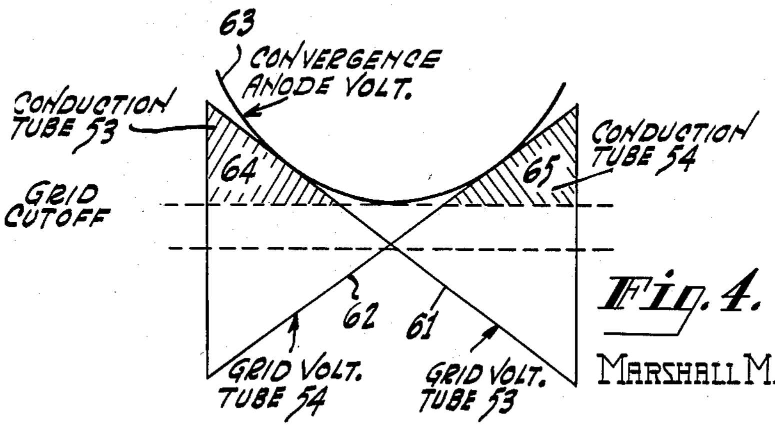
Figure 4 is a diagram for reference in explaining the operation of the sawtooth wave embodiment of the convergence wave generating apparatus; and, Figure 5 is a schematic circuit diagram of an embodiment of the invention in which a sinusoidal wave is rectified so as to develop the desired convergence control wave.

The manner in which the apparatus of Figure 3 functions to produce the convergence control wave 63 will be further explained with additional reference to Figure 4. The wave combining tubes 53 and 54 are biased at approximately 1½ times cut-off. As indicated in Figure 4, the grid cut-off potential for the tubes is shown relative to the oppositely phased sawtooth waves 61 and 62 impressed respectively upon the control grids of these tubes. As illustrated, the tube 53 conducts during approximately the first third of the cycle as shown by the shaded area 64. It is to be noted that even though the voltage wave form impressed upon the control grid is substantially linear, the anode voltage which corresponds inversely to the convergence control wave 63 will be non-linear because of the characteristic of the tube 53. Also, it is to be noted that the curved form of the anode voltage is in the desired direction so as to produce a convergence control wave having a form which approximates a parabola.

During the second third of the cycle, the sawtooth waves 61 and 62 impressed respectively upon the tubes 53 and 54 are ineffective to produce conduction in these tubes because of the described cut-off biasing thereof. Even though both of these tubes are cut off during this portion of the cycle, the anode voltage has the curved form such as illustrated because of the presence of the transformer 56, and particularly its primary winding 55. The inductance in the anode circuit of these tubes prevents the current from reversing instantaneously in the primary winding. The anode voltage therefore maintains its curved path such as indicated in Figure 4 until the one-half way point in the cycle is reached, after which the anode potential begins to increase. This increased anode potential also follows a curved path because of the inductance of the primary winding 55.

During the final one-third portion of the cycle, the tube 54 is conducting as indicated by the shaded area 65. Here again the curvature of the anode potential, as inversely represented by the wave 63, is a result of the non-linear characteristic of the tube.

It is to be noted that remote cut-off tubes, for example, of the 6AB5 or 6AB7 types, may be used for the electron tubes 53 and 54. By the use of such tubes, a somewhat better control of the center portion of the convergence control wave 63 may be effected without having to rely as much upon the inductance in the output circuit, such as the primary winding 55 of the output transformer 56.

Figure 5:
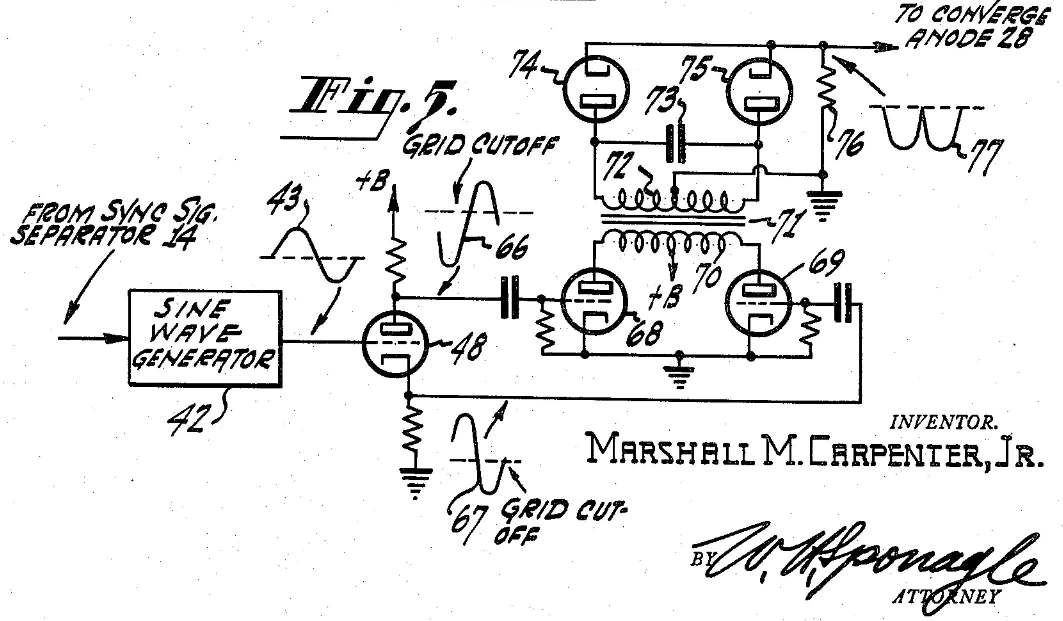

Having reference now to Figure 5 of the drawings, there is shown still another embodiment of the invention. The sinusoidal wave generator 42, which is synchronized in the manner described by suitable coupling to the sync signal separator 14 of Figure 1, produces a substantially sinusoidal wave 43 in its output circuit. The sinusoidal wave 43 has a frequency which is one-half of the desired frequency of the convergence control wave. The wave 43 is impressed upon the input circuit of a phase inverter including the electron tube 48. The phase inverter may be of the same type as that previously described. Accordingly, there are produced respectively at the anode and cathode electrodes of the tube 48 oppositely phased sinusoidal waves 66 and 67.

The waves 66 and 67 are impressed respectively upon a pair of electron tubes 68 and 69 connected in a push-pull circuit. These tubes are biased for class C operation in order to realize the maximum power capabilities thereof in conjunction with a tuned output circuit. The described biasing of the tubes 68 and 69 is of such a character that cut-off therein occurs substantially at the levels indicated by the broken lines associated with the sinusoidal waves 66 and 67.

The output circuit of the tubes 68 and 69 includes the primary winding 70 of an output transformer 71 connected between the anodes of these tubes. The secondary winding 72 of the output transformer 71 is tuned for resonance substantially at twice the frequency of the input waves 66 and 67 by means of a capacitor 73. There also is connected to the secondary winding 72 of the output transformer 71 a full wave rectifier including diodes 74 and 75. The output circuit of the full wave rectifier includes a resistor 76 across which is developed the desired convergence wave 77 which has a generally parabolic form.

As previously indicated, it is necessary to realize the maximum power in the tuned output circuit because of the fact that the load resistor 76 is necessarily small because of the distributed capacitance in the associated circuits. Another reason for the requirement that the circuit be relatively high-powered is the uneven loading produced by the rectifier diodes 74 and 75.

It is seen from the foregoing description of several illustrative embodiments of the invention that there is provided not only relatively simple convergence control wave generating apparatus, but also apparatus of this character which is capable of producing convergence control waves having steeper slopes than a parabolic wave. By the use of such a wave, it is possible to achieve better beam convergence in the corners of the raster than with a parabolic wave. The simplicity of the apparatus in accordance with this invention which is required to produce such convergence control waves is a result of the employment of waves having forms which are relatively easy to produce. As indicated, these waves include sine waves, square waves and sawtooth waves.

Having described a number of illustrative embodiments of the invention, its scope is set out in the appended claims.

What is claimed is:

1. In a cathode ray image-reproducing system wherein a plurality of electron beam components, which traverse predeflection paths that are spaced respectively about the longitudinal axis of a tube, are angularly deflected both horizontally and vertically to scan a raster in a predetermined plane and having field-producing means adjacent to said predeflection paths and energizable to effect substantial convergence of said beam components at all points of said raster, a system to energize said field-producing means comprising, two sources of waves of similar form but of opposite phase, electron tube means having two input circuits suitably coupled respectively to said two wave sources, said input circuits being biased so as to be rendered alternately responsive to said respective waves during different portions of each cycle of said waves, and a single output circuit for said electron tube means in which to develop a convergence control wave having an approximately parabolic shape.

2. In a cathode ray image-reproducing system wherein a plurality of electron beam components, which traverse predeflection paths that are spaced respectively about the longitudinal axis of a tube, are angularly deflected both horizontally and vertically to scan a raster in a predetermined plane and having field-producing means adjacent to said predeflection paths and energizable to effect substantial convergence of said beam components at all points of said raster, a system to energize said field-producing means comprising, two sources of waves of similar form but of opposite phase, two electron tubes each having an input grid electrode and an output anode electrode, means coupling the input grids of said tubes respectively to said wave sources, means biasing said input grid electrodes in such a manner as to effect the alternate conduction of the associated tubes respectively during different portions of each cycle of said waves, and means coupling said anodes together and to an output circuit for the development therein of a convergence control wave having an approximately parabolic shape.

3. In a cathode ray image-reproducing system wherein a plurality of electron beam components, which traverse predeflection paths that are spaced respectively about the longitudinal axis of a tube, are angularly deflected both horizontally and vertically to scan a raster in a predetermined plane and having field-producing means adjacent to said predeflection paths and energizable to effect substantial convergence of said beam components at all points of said raster, a system to energize said field-producing means comprising, two sources of waves of opposite phase each having a substantially sinusoidal component, two electron tubes each having an input circuit grid biased so as to effect substantially less than full cycle operation of said tubes, means coupling said electron tube grids to said respective wave sources, and means coupling the anodes of said electron tubes together and to a single output circuit whereby to effect a substantially full wave rectification of said oppositely phased waves so as to produce a convergence control wave having an approximately parabolic shape.

4. In a cathode ray image-reproducing system wherein a plurality of electron beam components, which traverse predeflection paths that are spaced respectively about the longitudinal axis of a tube, are angularly deflected both horizontally and vertically to scan a raster in a predetermined plane and having field-producing means adjacent to said predeflection paths and energizable to effect substantial convergence of said beam components at all points of said raster, a system to energize said field-producing means comprising, a source of a sine wave having a frequency equal to one half of the desired convergence control wave frequency, a source of a square wave having a frequency equal to one half of the frequency of the desired convergence control wave, means coupled to said wave sources to add said sine wave and said square wave in phase to produce a composite wave having sinusoidal and square wave components, means coupled to said wave adding means to invert the phase of said composite wave so as to produce two oppositely phased composite waves, and wave combining means including two electron tubes having control grids biased for substantially class B operation and having impressed respectively thereon said opposite phases of said composite wave, said two tubes having the anodes thereof coupled together and to a single output circuit in which to produce said convergence control wave of approximately parabolic shape.

5. In a cathode ray image-reproducing system wherein a plurality of electron beam components, which traverse predeflection paths that are spaced respectively about the longitudinal axis of a tube, are angularly deflected both horizontally and vertically to scan a raster in a predetermined plane and having field-producing means adjacent to said predeflection paths and energizable to effect substantial convergence of said beam components at all points of said raster, a system to energize said field-producing means comprising, a source of a sawtooth wave having the frequency of the desired convergence control wave, means coupled to said sawtooth wave source to invert the phase of said sawtooth wave so as to produce two oppositely phased sawtooth waves, and wave combining means including two electron tubes having respective grid electrodes biased to approximately one and one-half cut-off and having impressed respectively thereon said oppositely phased sawtooth waves, the anodes of said electron tubes being coupled together and to a single output circuit in which to develop the desired convergence control wave having an approximately parabolic shape.

References Cited in the file of this patent

UNITED STATES PATENTS

| | | |
|---|---|---|
| 2,178,093 | Zworykin et al. | Oct. 31, 1939 |
| 2,449,524 | Witherby et al. | Sept. 14, 1948 |
| 2,458,891 | Boyle | Jan. 11, 1949 |
| 2,672,574 | Evans | Mar. 16, 1954 |